(12) United States Patent
Tormasov et al.

(10) Patent No.: US 11,728,884 B2
(45) Date of Patent: Aug. 15, 2023

(54) SYSTEMS AND METHODS FOR REDUCING DATA LOSS IN SATELLITE TRANSMISSIONS

(71) Applicant: Acronis International GmbH, Schaffhausen (CH)

(72) Inventors: Alexander Tormasov, Moscow (RU); Serguei Beloussov, Costa del Sol (SG); Stanislav Protasov, Singapore (SG)

(73) Assignee: Acronis Interna banal GmbH, Schaffhausen (CH)

( * ) Notice: Subject to any disclaimer, the term of this patent is extended or adjusted under 35 U.S.C. 154(b) by 176 days.

(21) Appl. No.: 17/393,657

(22) Filed: Aug. 4, 2021

(65) Prior Publication Data

US 2022/0173798 A1  Jun. 2, 2022

Related U.S. Application Data

(60) Provisional application No. 63/119,075, filed on Nov. 30, 2020.

(51) Int. Cl.
*H04B 7/185* (2006.01)
(52) U.S. Cl.
CPC ................ *H04B 7/18513* (2013.01)
(58) Field of Classification Search
None
See application file for complete search history.

(56) References Cited

U.S. PATENT DOCUMENTS

| | | | | |
|---|---|---|---|---|
| 2003/0224724 A1* | 12/2003 | Kato | ................ | H04B 7/18523 455/12.1 |
| 2011/0169688 A1* | 7/2011 | Wyler | ................ | H04B 7/2041 342/354 |
| 2016/0112117 A1* | 4/2016 | Platzer | ................ | H04W 24/02 370/316 |

* cited by examiner

*Primary Examiner* — Shripal K Khajuria
(74) *Attorney, Agent, or Firm* — ArentFox Schiff LLP; Michael Fainberg (57) ABSTRACT

Aspects of the disclosure describe methods and systems for transmitting data via a satellite to a ground node. In one exemplary aspect, a method comprises splitting, on a satellite, a data segment into a plurality of data chunks, wherein an amount of the data chunks equals a number of ground nodes that the data chunks will be transmitted to. For each respective data chunk, the method comprises determining whether the satellite has a stable connection with the respective ground node. When the satellite has the stable connection with the respective ground node, the method comprises transmitting, by the satellite, the respective data chunk to the respective ground node, and when the satellite does not have the stable connection with the respective ground node, the method comprises transmitting, by the satellite, the respective data chunk to a neighboring satellite for storage until the stable connection is established.

20 Claims, 4 Drawing Sheets

SYSTEMS AND METHODS FOR REDUCING DATA LOSS IN SATELLITE TRANSMISSIONS

CROSS-REFERENCE TO RELATED APPLICATIONS

This application claims the benefit of U.S. Provisional Application No. 63/119,075, filed Nov. 30, 2020, which is herein incorporated by reference.

FIELD OF TECHNOLOGY

The present disclosure relates to the field of satellites, and, more specifically, to systems and methods for reducing data loss in satellite transmissions.

BACKGROUND

In recent years, the number of space satellites used in various fields has been growing rapidly. Along with state, military, and scientific satellites, satellites belonging to private companies are emerging. The cost of manufacturing, launching and maintaining satellites has also significantly reduced.

Recently, various types of small satellites have appeared such as mini-satellites, microsatellites, nanosatellites, Cube-Sats and PocketCubes. Their weight can be less than one kilogram, and their cost is only a few thousand dollars. Accordingly, their launch has become available to small organizations (e.g., universities, schools, individuals, etc.).

Satellites perform a wide variety of tasks including surveillance, intelligence gathering, industrial intelligence, wireless communication, Internet service delivery, etc. Most of these tasks are related to the collection, storage, and transmission of data. In this regard, the problem of the safety of such data is gaining in importance. First of all, the data backup and transmission from the satellites to the Earth is associated with the problems of potential losing valuable data.

For data transmission, the satellite must be connected to ground stations. There is a chain of ground stations on the ground, and the satellite takes turns sending data as it moves over the ground. With well-functioning communication channels, this should act as in cellular networks, but in reality there is a need for algorithms adapted for fast switching from one ground station to another, taking into account the possibility of signal loss, station unavailability, data transmission failure, and other problems leading to data loss.

SUMMARY

Aspects of the disclosure relate to the field of data storage. In particular, aspects of the disclosure describe methods and systems for transmitting data via a satellite to a ground node.

In one exemplary aspect, the method comprises splitting, on a satellite, a data segment into a plurality of data chunks, wherein an amount of the data chunks equals a number of ground nodes that the data chunks will be transmitted to. For each respective data chunk, the method comprises determining whether the satellite has a stable connection with the respective ground node. When the satellite has the stable connection with the respective ground node, the method comprises transmitting, by the satellite, the respective data chunk to the respective ground node, and when the satellite does not have the stable connection with the respective ground node, the method comprises transmitting, by the satellite, the respective data chunk to a neighboring satellite for storage until the stable connection is established.

In some aspects, when the stable connection is established, the method comprises requesting the respective data chunk from the neighboring satellite, receiving the respective data chunk, and transmitting the respective data chunk to the respective ground node.

In some aspects, determining whether the satellite has the stable connection with the respective ground node is based on a distance between the satellite and the respective ground node, wherein the distance changes based on a movement of the satellite and a rotation of an astronomical body where the respective ground node is located.

In some aspects, the neighboring satellite is further configured to transmit the respective data chunk to the respective ground node when a stable connection between the neighboring satellite and the respective ground node is established.

In some aspects, the method further comprises generating one or more redundancy chunks of the plurality of data chunks in accordance with an erasure encoding algorithm.

In some aspects, when the satellite has the stable connection with the respective ground node, the method comprises determining whether the respective ground node is to receive at least one of the redundancy chunks, and in response to determining that the respective ground node is to receive at least one of the redundancy chunks, transmitting at least one of the redundancy chunks to the respective ground node.

In some aspects, when the satellite does not have the stable connection with the respective ground node, the method comprises transmitting at least one of the redundancy chunks to the neighboring satellite.

In some aspects, an amount of the redundancy chunks is equal to an amount of neighboring satellites, wherein the redundancy chunks are distributed to the neighboring satellites.

In some aspects, the stable connection is a connection state wherein a set amount of data within an allotted time period is transferable without exceeding a data loss threshold during transmission.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for reducing data loss in satellite transmissions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
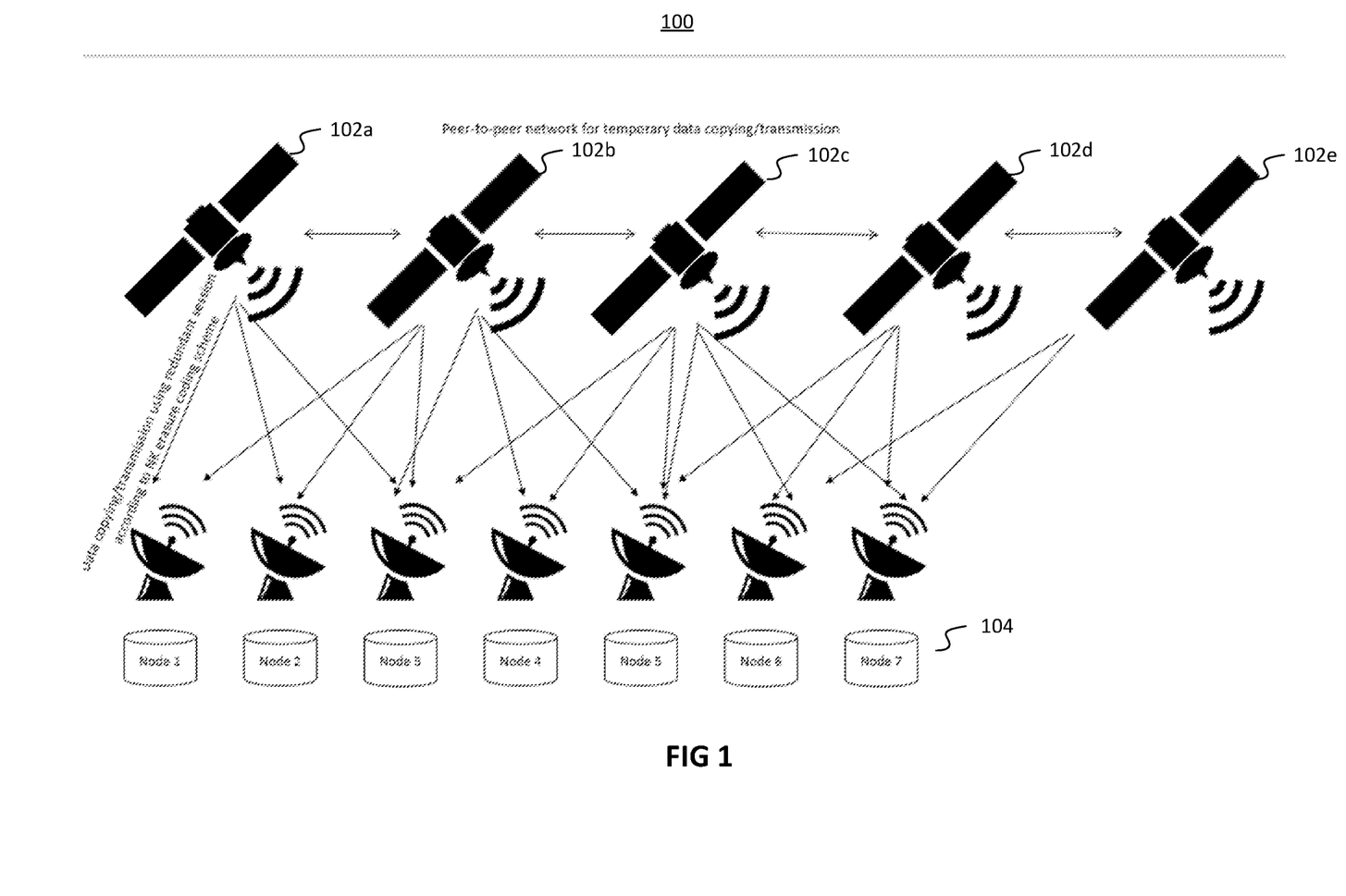
FIG. 1 is a block diagram illustrating a system for reducing data loss in satellite transmissions.

FIG. 1 is a block diagram illustrating system 100 for reducing data loss in satellite transmissions. FIG. 1 depicts a plurality of satellites 102, which may be orbiting an astronomical body such as a planet or a moon. Each satellite 102a-e may be configured to communicate with a ground node 104 (used interchangeably with ground station 104). Each node/station comprises an antenna configured to receive and transmit signals to one or more satellites 102. Each node/station further comprises a storage device (e.g., a server) that is configured to store data received from a different node, a satellite, a computing device (e.g., a smart phone, computer desktop, laptop, etc.). In some aspects, satellites 102a-e are all connected in a peer-to-peer network.

Because satellite signals are sent over long distances and comprise low-power transmissions, they are prone to interference caused by weather, cosmic radiation, and electromagnetic noise. This can cause data loss by signal errors or signal gaps. In addition, a satellite may move too far away from a particular ground node and lose connection with the node for a brief period of time. This increase in distance may be due to the rotation of the astronomical body, movement of the satellite, or movement of the astronomical body itself.

To reduce the data loss in satellite transmissions, the present disclosure describes system 100 that involves splitting data into multiple chunks. More specifically, suppose that satellite 102a comprises a data segment that is to be transmitted to nodes 1-7. Satellite 102a may split the data segment into a plurality of data chunks—particularly in an amount that equals the number of ground nodes that the data chunks will be transmitted to. For example, a data segment such as a video feed may be split into 7 data chunks (e.g., 7 portions of the video feed).

For each respective data chunk, satellite 102a may determine whether it has a stable connection with a respective ground node. For example, satellite 102a may desire to send a particular data chunk to node 1. As depicted in FIG. 1, at its current position, satellite 102a is capable of communicating with nodes 1-3 (based on the arrows). It is possible that a different satellite (e.g., 102b) is capable of communicating with more nodes (e.g., nodes 1-5) based on its position relative to the astronomical body where nodes 1-5 are located. It is also possible that a different satellite (e.g., 102e) is capable of communicating with fewer nodes. Based on whether there is a stable connection with a respective ground node, satellite 102a determines whether to transmit the respective data chunk to the respective ground node or transmit the data chunk to a different neighboring satellite.

In some aspects, a stable connection refers to a connection state in which two or more entities can exchange data uninterrupted (e.g., by disconnections and congestion) at a threshold speed (e.g., at least 4 Mbps). In some aspects, the stable connection is a connection state wherein a set amount of data (e.g., 5 GB) within an allotted time period (e.g., 5 minutes) is transferable without exceeding a data loss threshold (e.g., 0.5 Mb lost per minute) during transmission. In some aspects, a stable connection refers to a connection state in which a determined quality of service (QoS) is greater than a threshold QoS. The determined QoS may be a function of one or more parameters including bandwidth, throughput, bit rate, latency, jitter, and data loss. In this case, the bandwidth is the number of bits per second that a communication link between a respective satellite and a neighboring satellite or ground node can send or receive. The bit rate represents the maximum amount of bits per second that can be transmit/received by the satellite over the communication link. The throughput is the actual amount of data being sent or received over a time period on the communication link. The latency may be a round-trip latency from the satellite to a particular destination (e.g., a ground node). For example, a radio signal takes about 120 milliseconds to reach a satellite that is geostationary and another 120 milliseconds to reach a node (e.g., ground base station). Any time greater than this average time is part of latency. Jitter is a variation in the delay of received packets by either the satellite or the ground node. Data loss may represent an amount of packets lost in a given time period. A given satellite may calculate each of these parameters for a communication link over a period of time with a ground node/neighboring satellite. The satellite may then combine the parameters in accordance with a QoS function to determine a QoS score. The score may be a quantitative value (e.g., a fraction, ratio, percentage, etc.). Suppose that the determine QoS score is 78% for a communication link between the satellite and a ground node. If the threshold QoS is 75%, the satellite will determine that the stable connection exists.

Referring to FIG. 1, when satellite 102a has a stable connection with node 1 (i.e., the node that the data chunk is to be sent to), satellite 102a may transmit the respective data chunk to node 1. However, when satellite 102a does not have a stable connection with node 1, satellite 102a may transmit the respective data chunk to a neighboring satellite (e.g., satellite 102b) for storage until the stable connection is established. To assess the stability of a connection, the satellite may send test data (e.g., packets) to the ground node/neighboring satellite.

As mentioned previously, determining whether a satellite has a stable connection with a respective ground node is based on at least a distance between the satellite and the respective ground node. For example, while at its current position depicted in FIG. 1, satellite 102a may be unable to communicate with node 4 because the distance between the two entities prevents a connection—let alone a stable one. As also mentioned previously, this distance changes based on a movement of the satellite and a rotation of an astronomical body where the respective ground node is located. It is possible, for example, that a stable connection may not be established between satellite 102a and node 4 until satellite 102a reaches the position that satellite 102b is depicted as being in.

Accordingly, unlike node 1, which may be sent the data chunk, a data chunk intended for node 4 may be sent to a neighboring satellite (e.g., 102b). The reason this is performed is to generate a copy of the data chunk. If for some reason the data chunk is lost at satellite 102a before a connection can be established between node 4 and satellite 102a, a copy still exists at the neighboring satellite 102b.

In some aspects, subsequent to transmitting a data chunk to a neighboring satellite (e.g., 102b), the neighboring satellite is further configured to transmit the respective data chunk to the respective ground node (e.g., node 4) when a stable connection between the neighboring satellite and the respective ground node is established. In other words, satellite 102a may be unable to connect to node 4 for a period of time. If within that period of time satellite 102b is able to establish a stable connection with node 4, satellite 102b may proceed with transmitting the received data chunk to node 4. Satellite 102b may subsequently send a confirmation message to satellite 102a indicating that the data chunk has been successfully transmitted to node 4. The benefit of this communication is that some data may have time constraints, which require the data to be transmitted to the ground nodes within a set amount of time. The satellite may determine a time it will take to establish a stable connection with a given respective ground node. For example, the satellite may calculate, based on its own movement, the movement of the astronomical body, and GPS coordinates of the ground node, an amount of time before the satellite enters a region within which a stable connection can potentially be established. If the amount of time is greater than the set amount of time within which the data needs to be transmitted, the satellite may transmit the data to a neighboring satellite that can establish the stable connection and include instructions to transmit the data to the intended destination (e.g., node 4). In some aspects, if no neighboring satellite can establish the stable connection with the ground node, the satellite may determine a path (either via a plurality of ground nodes or a plurality of satellites or both) through which the data can be transmitted, until it reaches the intended destination via network hops.

In terms of estimating when a stable connection will be formed with a node, such as node 4, satellite 102a may determine a distance between satellite 102a and node 4. For example, satellite 102a may retrieve GPS coordinates of node 4 from a locations database, and determine a current location of satellite 102a. Based on the speed at which the astronomical body is rotating and its direction (either toward or away from satellite 102a) and a speed of satellite 102a, satellite 102a may estimate a connection establishment time (e.g., 2 hours, 4 minutes). Until a stable connection is formed, a satellite cannot exchange data with the ground node. Accordingly, the satellite may rely on neighboring satellites for temporary storage.

In some aspects, when satellite 102a transmits a data chunk to satellite 102b, it may delete its local copy of the data chunk. Then, when the stable connection is established with node 4, satellite 102a may request the respective data chunk from the neighboring satellite 102b. Subsequent to receiving the respective data chunk from satellite 102b, satellite 102a may transmit the respective data chunk to the respective ground node 4.

To avoid data loss during transmission to ground nodes/stations 104, in some aspects, satellites 102 may employ redundancy algorithms such as erasure coding schemes (e.g., N–K scheme). In particular, data is transmitted with redundancy, so that data loss in the absence of communication with the receiving ground station can be compensated.

For example, satellite 102a may split each data segment into N chunks, which corresponds to the number of ground stations to which this data is sent (data backup copies). This data may be sent to storage nodes during K data transmission sessions such that K=N+M. In this case, N is the number of data chunks and M is the number of duplicate sessions. For example, there may be 5 chunks of data and a user may desire to store them with +2 chunks redundancy. This results in 7 transmission sessions. In some aspects, the additional two pieces of data are parity codes in which linear combinations of the 5 chunks are represented. Thus, if one chunk is lost, the parity codes can be used to retrieve the lost chunk.

Because communication with ground stations can be lost (for example, when moving from the coverage area of one station to the coverage area of the next), a peer-to-peer network can be used as an additional means of storing transmitted data.

In FIG. 1, a data segment may be split into 7 chunks with an additional 3 chunks for redundancy. When a satellite (e.g., satellite 102a) has a stable connection with the respective ground node (e.g., node 1), the satellite may determine whether the respective ground node is to receive at least one of the redundancy chunks. In response to determining that the respective ground node is to receive at least one of the redundancy chunks, the satellite may transmit at least one of the redundancy chunks to the respective ground node. For example, satellite 102a may transmit a redundancy chunk to node 1.

When the satellite (e.g., satellite 102a) does not have the stable connection with a respective ground node (e.g., node 4), the satellite may transmit at least one of the redundancy chunks to the neighboring satellite (e.g., 102b).

In some aspects, the amount of the redundancy chunks is equal to an amount of neighboring satellites and the redundancy chunks are distributed to the neighboring satellites. For example, rather than transmitting the redundancy chunks to ground nodes, a satellite 102a may identify neighboring satellites (e.g., 102b-e) and generate 4 redundancy chunks. Each redundancy chunk may then be transmitted to the neighboring satellites.

Figure 2:
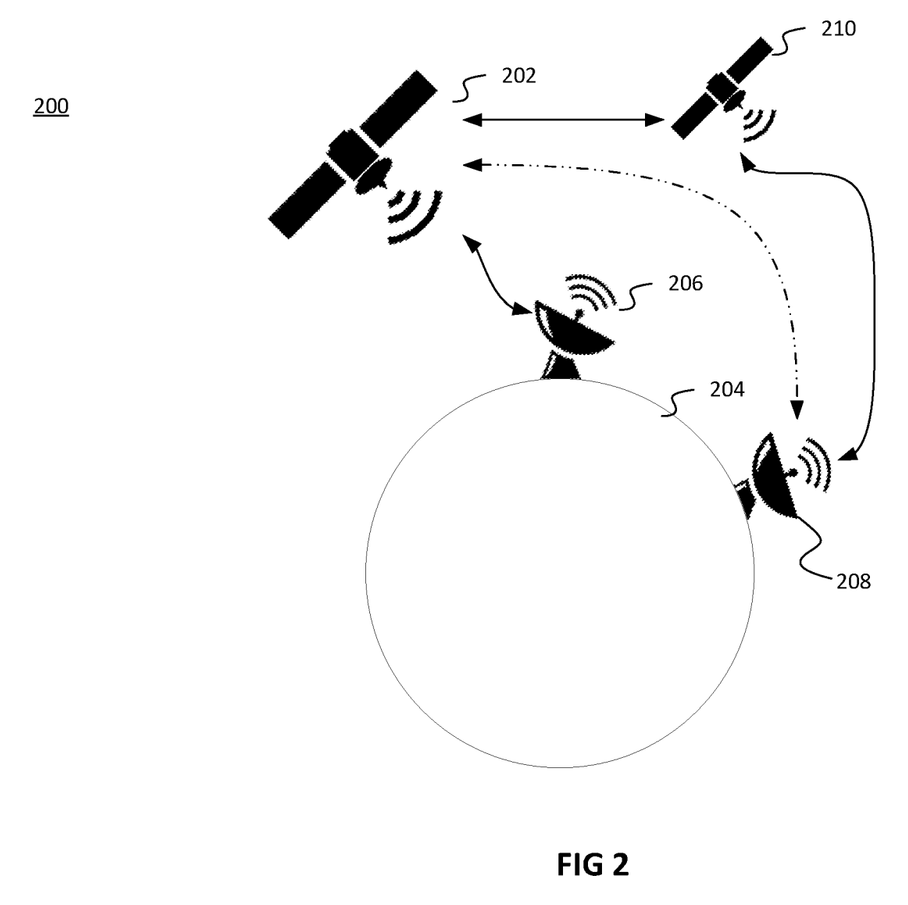
FIG. 2 is a diagram illustrating satellites communicating with ground nodes on a rotating astronomical body.

FIG. 2 is a diagram 200 illustrating satellites communicating with ground nodes on a rotating astronomical body. In some cases, a geostationary orbit is associated with satellites. However, as different types of satellites that are smaller and abundant are launched into space, the orbit of satellites may not be geostationary. Instead, there may be greater flexibility to move independent of the astronomical body's rotation. For example, in FIG. 2, satellite 202 and satellite 210 may not have geostationary orbit. Suppose that astronomical body 204 is a moon that is rotating clockwise. Satellites 202 and 210 may be CubeSats that are moving counter clockwise. Accordingly, the distance between satellite 202 and node 206 may increase over time. Likewise the distance between satellite 210 and node 208 may increase over time.

Satellite 202 may transmit a data chunk to node 206 over a given communication link (depicted as a solid line) and may intend to transmit another data chunk to node 208. The communication link between satellite 202 and node 208 is represented by a dashed line. This signifies that the communication is instable between the two entities. For example, the QoS over the communication link may be lower than a threshold QoS. Satellite 202 may determine an amount of time it will take to establish a stable connection with node 208 based on the movement of body 204 and satellite 202. Satellite 202 may further determine whether the amount of time is less than a required time for storage (a deadline by which the data chunks need to be transmitted to the nodes on body 204). If the amount of time is less than the required time (i.e., the satellite will reach the node in time), satellite 202 may wait for the stable connection to be established with node 208.

However, if the amount of time is greater than the required time, satellite 202 may transmit the data chunk to be transmitted to node 208, to a neighboring satellite. Satellite 202 may be configured to transmit a discovery message and identify satellites that respond to the discovery message. In the discovery message, the satellite may query a relative location and movement trajectory of the satellite. Suppose that satellite 210 responds to the discovery message and provides the requested information. Satellite 202 may determine whether satellite 210 already has a stable connection established with node 208 or whether satellite 210 will establish the stable connection before satellite 202 will. If the satellite 210 already has established the connection or will establish the connection accordingly, satellite 202 transmits the data chunk to satellite 210 and further transmits instructions to transmit the data chunk to node 208. In some aspects, satellite 202 may encrypt the data chunk (e.g., with a public key) so that satellite 210 cannot access the contents of the data chunk. Node 208 may then decrypt the encrypted data chunk received from satellite 210 (e.g., with a private key).

In FIG. 2, satellite 202 has established a stable connection with node 206. Because both entities are moving farther apart, the stable connection will end within a time period. In some aspects, satellite 202 may determine an amount of time that the stable connection will exist based on the movements of satellite 202 and body 204. Satellite 202 may maintain a database, for example, in which each node is associated with a stable connection region. A stable connection region may be a region in space within which a stable connection can be established. If a satellite is not within the region, the stable connection is not possible. Accordingly, satellite 202 may determine, specifically, an amount of time that satellite 202 will spend in that region based on the movements mentioned above. Suppose that the time it takes to transmit a data chunk is 30 seconds and that satellite 202 determines that it will exit the stable connection region in 10 seconds. In response to determining that the transmission time is greater than the time of stable connection, satellite 202 may split the data chunk into a first and second portion. The first portion of the data chunk can be transmitted within the time of stable connection. Accordingly, satellite 202 transmits the first portion to node 206. Satellite 202 transmits the second portion to satellite 210 (in response to confirming that satellite 210 has established a stable connection with node 206 and will state within the stable connection region for enough time to transmit the second portion).

Figure 3:
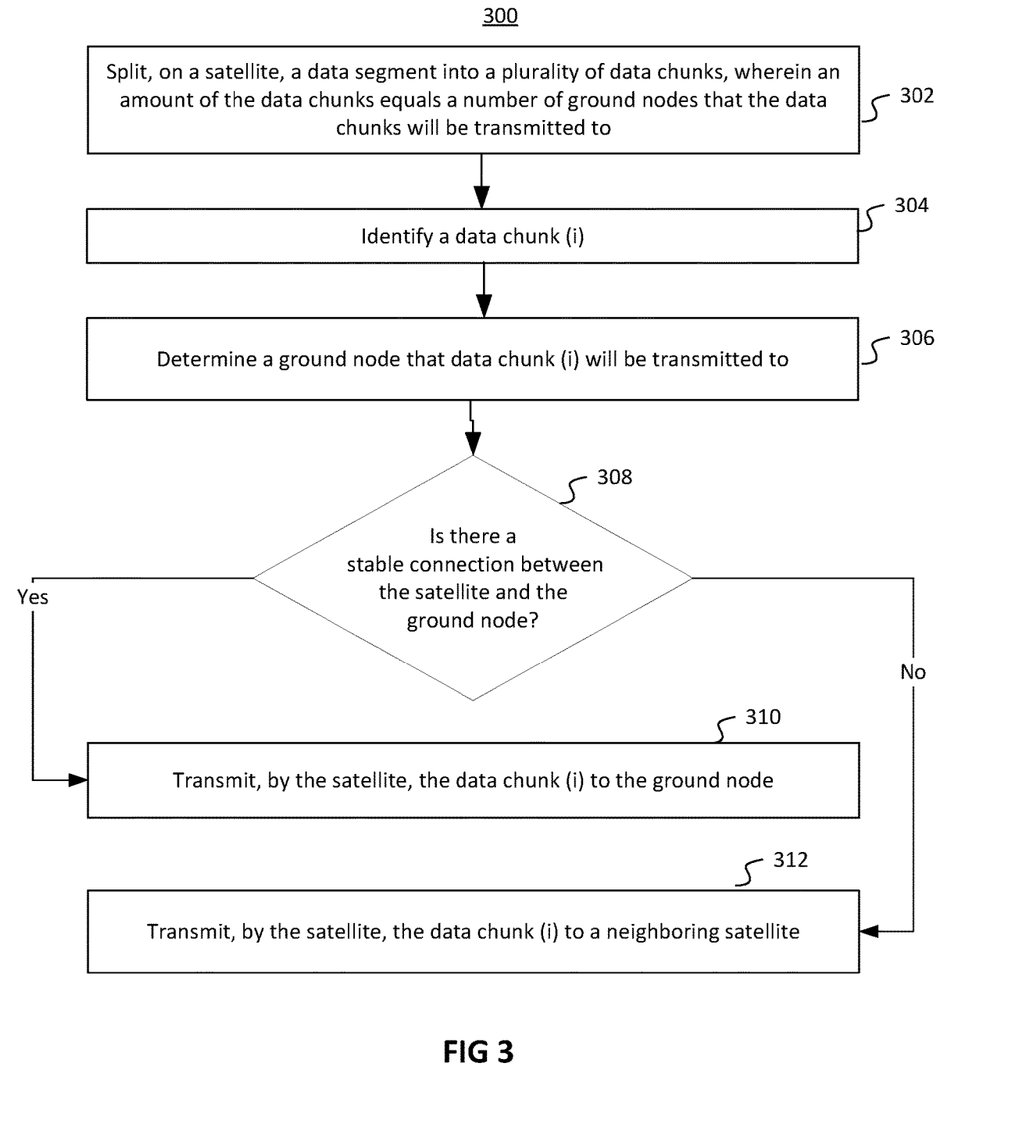
FIG. 3 illustrates a flow diagram of a method for performing satellite transmissions.

FIG. 3 illustrates a flow diagram of method 300 for performing satellite transmissions. At 302, a satellite splits a data segment into a plurality of data chunks, wherein an amount of the data chunks equals a number of ground nodes that the data chunks will be transmitted to. At 304, the satellite identifies a data chunk (i). At 306, the satellite determines a ground node that data chunk (i) will be transmitted to. At 308, the satellite determines whether there is a stable connection between the satellite and the ground node. In response to determining that there is, at 310, the satellite transmits the data chunk (i) to the ground node. In response to determining that there is no stable connection, at 312, the satellite transmits the data chunk (i) to a neighboring satellite.

Figure 4:
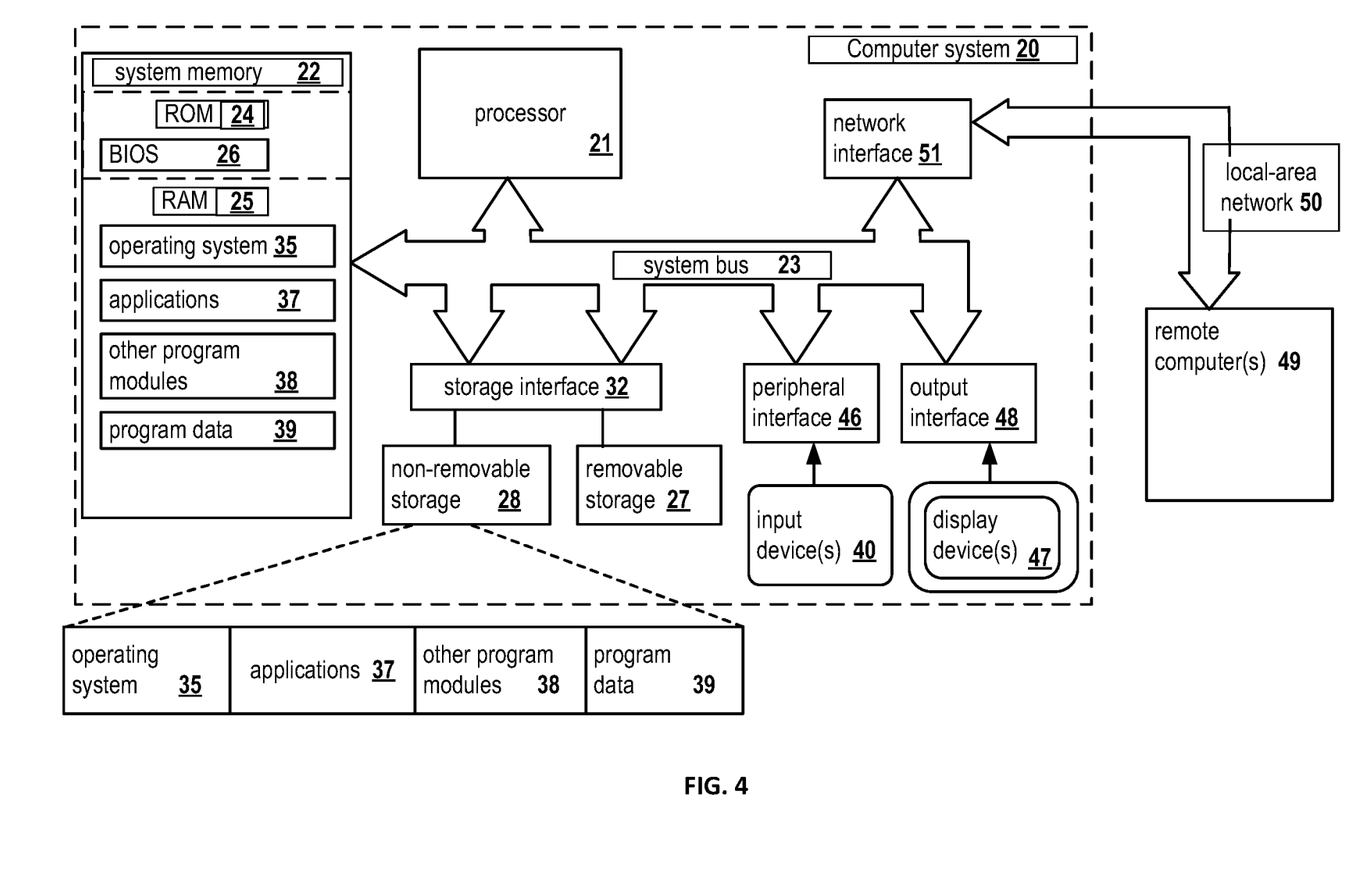
FIG. 4 presents an example of a general-purpose computer system on which aspects of the present disclosure can be implemented.

FIG. 4 is a block diagram illustrating a computer system 20 on which aspects of systems and methods for reducing data loss in satellite transmissions may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for transmitting data via a satellite, the method comprising:
splitting, on a satellite, a data segment into a plurality of data chunks, wherein an amount of the data chunks equals a number of ground nodes that the data chunks will be transmitted to;
for each respective data chunk:
determining whether the satellite has a stable connection with the respective ground node;
when the satellite has the stable connection with the respective ground node, transmitting, by the satellite, the respective data chunk to the respective ground node; and
when the satellite does not have the stable connection with the respective ground node, transmitting, by the satellite, the respective data chunk to a neighboring satellite for storage until the stable connection is established.

2. The method of claim 1, further comprising:
when the stable connection is established, requesting the respective data chunk from the neighboring satellite;
receiving the respective data chunk; and
transmitting the respective data chunk to the respective ground node.

3. The method of claim 1, wherein determining whether the satellite has the stable connection with the respective ground node is based on a distance between the satellite and the respective ground node, wherein the distance changes based on a movement of the satellite and a rotation of an astronomical body where the respective ground node is located.

4. The method of claim 1, wherein the neighboring satellite is further configured to transmit the respective data chunk to the respective ground node when a stable connection between the neighboring satellite and the respective ground node is established.

5. The method of claim 1, further comprising generating one or more redundancy chunks of the plurality of data chunks in accordance with an erasure encoding algorithm.

6. The method of claim 5, further comprising:
when the satellite has the stable connection with the respective ground node, determining whether the respective ground node is to receive at least one of the redundancy chunks; and
in response to determining that the respective ground node is to receive at least one of the redundancy chunks, transmitting at least one of the redundancy chunks to the respective ground node.

7. The method of claim 6, further comprising:
when the satellite does not have the stable connection with the respective ground node, transmitting at least one of the redundancy chunks to the neighboring satellite.

8. The method of claim 5, wherein an amount of the redundancy chunks is equal to an amount of neighboring satellites, wherein the redundancy chunks are distributed to the neighboring satellites.

9. The method of claim 1, wherein the stable connection is a connection state wherein a set amount of data within an allotted time period is transferable without exceeding a data loss threshold during transmission.

10. A system for transmitting data via a satellite, the system comprising:
a hardware processor of a satellite, wherein the hardware processor is configured to:
split, on the satellite, a data segment into a plurality of data chunks, wherein an amount of the data chunks equals a number of ground nodes that the data chunks will be transmitted to;
for each respective data chunk:
determine whether the satellite has a stable connection with the respective ground node;
when the satellite has the stable connection with the respective ground node, transmit, by the satellite, the respective data chunk to the respective ground node; and
when the satellite does not have the stable connection with the respective ground node, transmit, by the satellite, the respective data chunk to a neighboring satellite for storage until the stable connection is established.

11. The system of claim 10, wherein the hardware processor is further configured to:
when the stable connection is established, request the respective data chunk from the neighboring satellite;
receive the respective data chunk; and
transmit the respective data chunk to the respective ground node.

12. The system of claim 10, wherein the hardware processor is further configured to determine whether the satellite has the stable connection with the respective ground node based on a distance between the satellite and the respective ground node, wherein the distance changes based on a movement of the satellite and a rotation of an astronomical body where the respective ground node is located.

13. The system of claim 10, wherein the neighboring satellite is further configured to transmit the respective data chunk to the respective ground node when a stable connection between the neighboring satellite and the respective ground node is established.

14. The system of claim 10, wherein the hardware processor is further configured to generate one or more redundancy chunks of the plurality of data chunks in accordance with an erasure encoding algorithm.

15. The system of claim 14, wherein the hardware processor is further configured to:
when the satellite has the stable connection with the respective ground node, determine whether the respective ground node is to receive at least one of the redundancy chunks; and
in response to determining that the respective ground node is to receive at least one of the redundancy chunks, transmit at least one of the redundancy chunks to the respective ground node.

16. The system of claim 15, wherein the hardware processor is further configured to:
when the satellite does not have the stable connection with the respective ground node, transmit at least one of the redundancy chunks to the neighboring satellite.

17. The system of claim 14, wherein an amount of the redundancy chunks is equal to an amount of neighboring satellites, wherein the redundancy chunks are distributed to the neighboring satellites.

18. The system of claim 10, wherein the stable connection is a connection state wherein a set amount of data within an allotted time period is transferable without exceeding a data loss threshold during transmission.

19. A non-transitory computer readable medium storing thereon computer executable instructions for transmitting data via a satellite, including instructions for:
   splitting, on a satellite, a data segment into a plurality of data chunks, wherein an amount of the data chunks equals a number of ground nodes that the data chunks will be transmitted to;
   for each respective data chunk:
      determining whether the satellite has a stable connection with the respective ground node;
      when the satellite has the stable connection with the respective ground node, transmitting, by the satellite, the respective data chunk to the respective ground node; and
      when the satellite does not have the stable connection with the respective ground node, transmitting, by the satellite, the respective data chunk to a neighboring satellite for storage until the stable connection is established.

20. The non-transitory computer readable medium of claim 19, further comprising instructions for:
   when the stable connection is established, requesting the respective data chunk from the neighboring satellite;
   receiving the respective data chunk; and
   transmitting the respective data chunk to the respective ground node.

* * * * *